United States Patent [19]

Yamada et al.

[11] Patent Number: 4,499,507
[45] Date of Patent: Feb. 12, 1985

[54] DATA REPRODUCING APPARATUS FOR REPRODUCING DIGITAL DATA RECORDED ON MULTI-TRACKS

[75] Inventors: Yasuhiro Yamada, Fussa; Takaro Mori, Sagamihara, both of Japan

[73] Assignee: Victor Company of Japan, Ltd., Kanagawa, Japan

[21] Appl. No.: 429,334

[22] Filed: Sep. 30, 1982

[30] Foreign Application Priority Data

Oct. 13, 1981 [JP] Japan .................................. 56-163122

[51] Int. Cl.$^3$ .......................... G11B 15/02; G11B 5/09
[52] U.S. Cl. .......................................... 360/26; 360/51
[58] Field of Search ............................... 360/26, 51, 27

[56] References Cited

U.S. PATENT DOCUMENTS

4,365,210 12/1982 Harrington et al. .................... 360/51
4,425,589  1/1984 Camras .................................... 360/51

*Primary Examiner*—Vincent P. Canney
*Attorney, Agent, or Firm*—Lester Horwitz

[57] ABSTRACT

A data reproducing apparatus for reproducing data recorded on multi-tracks, comprises a signal transducer for simultaneously reproducing pre-recorded frame signals from a plurality of tracks on a recording medium, a write-in address generating circuit provided in each of transmission systems for reproduced signals from the tracks obtained in parallel from the signal transducer, for generating a write-in address indicating the number of bits of data within one frame signal from a counter which counts clock pulses having a period equal to the transmission bit rate, a memory into which data within frame signals reproduced from the tracks are written and then read out, and a memory control circuit for controlling the memory so as to successively and recursively apply the data within the frame signals reproduced from the tracks and write in the data at the write-in addresses obtained from the write-in address generating circuit, and read out the written-in data from the memory with the timing arranged after a predetermined time has elapsed.

6 Claims, 28 Drawing Figures

| | SYNC | W0<br>D0~D15 | W1<br>D16~D31 | W2<br>D32~D47 | - - - - - - - | W13<br>D208 D223 | CRC |
|---|---|---|---|---|---|---|---|
| 1st TRACK | | | | | | | |
| 8th TRACK | SYNC | W0<br>D0~D15 | W1<br>D16~D31 | W2<br>D32~D47 | - - - - - - - | W13<br>D208 D223 | CRC |

DATA REPRODUCING APPARATUS FOR REPRODUCING DIGITAL DATA RECORDED ON MULTI-TRACKS

BACKGROUND OF THE INVENTION

The present invention generally relates to data reproducing apparatuses for reproducing digital data recorded on multi-tracks on recording mediums such as a magnetic tape, and more particularly to a data reproducing apparatus which obtains a data reproduction output by automatically correcting static and dynamic time deviation between reproduced signals from each track introduced due to positional deviation or skew in a signal transducer with respect to the track width direction of the multi-tracks.

Conventionally, a multi-track type magnetic recording and reproducing apparatus is known, in which a digital signal obtained by subjecting an analog audio signal to digital pulse modulation (pulse code modulation, for example) is dispersed and recorded on a plurality of tracks (multi-tracks) on a magnetic tape by a stationary magnetic head. In such a recording and reproducing apparatus, the recorded digital signals are simultaneously reproduced by the magnetic head, and the reproduced signals are converted into the original analog audio signal. The digital signal is dispersed and recorded on the multi-tracks because the width of head gaps of the above magnetic head cannot be made smaller than a certain value due to manufacturing limitations, and also because the recording must be carried out using a fairly high tape speed in order to obtain a desired transmission rate. However, the recording and reproducing time will become short if the tape speed is set to a considerably high speed since the length of the magnetic tape is finite. For example, it will be impossible to obtain a recording and reproducing time of one hour which is required for recording and reproducing a stereo program.

Accordingly, in order to obtain the above desired recording and reproducing time, the tape speed is reduced to a speed in the order of 7.1 cm/sec, for example, and the above digital signal is dispersed and recorded on the multi-tracks along the longitudinal direction of the magnetic tape so as to reduce the transmission rate to a rate with which the information can be transmitted with the reduced tape speed.

The magnetic head, which is a signal transducer for reproducing the digital signal (data) recorded on the multi-tracks, comprises a plurality of head gaps along the track width direction of the multi-tracks. The number of the head gaps corresponds to the number of the multi-tracks. However, due to manufacturing limitations, it is difficult to align the plurality of head gaps along the same straight line in the track width direction. Thus, slight inconsistency in the position or skew is introduced in the head gaps.

The above positional inconsistency or the so-called skew introduced in each of the head gaps causes static and dynamic time deviation between reproduced signals from each track upon reproduction of the multi-tracks on the magnetic tape, in cooperation with the different travelling conditions with respect to each track and the like. As a result, there were cases wherein code errors were introduced and the analog audio signal could not be reproduced accurately.

Hence, conventionally, a correcting circuit was used upon recording and reproduction for matching with the time deviation corresponding to the skew in the recording magnetic head and the reproducing magnetic head and correcting (de-skewing) this time deviation. However, adjustments are necessary in accordance with the skew in the magnetic head in order to perform the above de-skewing. In addition, there was a disadvantage in that the above de-skewing had no effects with respect to dynamic time deviation.

SUMMARY OF THE INVENTION

Accordingly, it is a general object of the present invention to provide a novel and useful data reproducing apparatus for reproducing data recording on multi-tracks, in which the above described disadvantages have been overcome.

Another and more specific object of the present invention is to provide a data reproducing apparatus in which a write-in address is produced from counters of a number corresponding to the number of reproduced tracks, data reproduced from multi-tracks are successively written into a memory for each reproduced data from each track according to output of the above counters, and the written-in data of each track are read out from the above memory with the timing arranged after a certain time period has elapsed. According to the apparatus of the present invention, effects of skew introduced due to inconsistently arranged signal pickup parts (corresponding to head gaps in the case of a magnetic head) of a signal transducer for multi-tracks and the like, can be compensated automatically.

Still another object of the present invention is to provide a data reproducing apparatus in which the timing with which written-in data is read out from a memory written in with data reproduced from the multi-tracks is controlled by an output signal of a counter provided in a reproduced signal transmission system of a track formed at substantially the central part with respect to the track width direction among the multi-tracks on a recording medium. According to the apparatus of the present invention, reproduced data can be obtained most stably from the tracks formed at substantially the central part with respect to the track width direction of the recording medium virtually regardless of the conversion at the signal transducer, changes in the tape travel system, and the like, and the effects of skew can be compensated most stably.

Another object of the present invention is to provide a data reproducing apparatus in which, a code error detection result obtained from a code error detection code reproduced from the multi-tracks wherein the data is time-sequentially multiplexed with a synchronizing signal and the code error detection code, is simultaneously produced with the data. According to the apparatus of the present invention, the correction of code errors in data comprising a plurality of words can be suitably performed in terms of words, in a code error correcting circuit provided in a succeeding stage.

Other objects and further features of the present invention will be apparent from the following detailed description when read in conjunction with the accompanying drawings.

DETAILED DESCRIPTION

Figure 1:
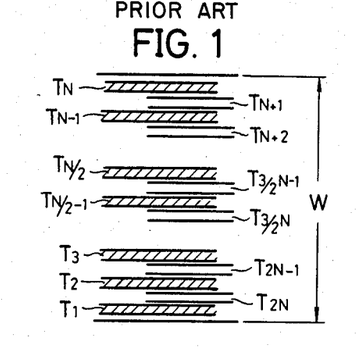
FIG. 1 shows an example of a track pattern on a magnetic tape which is to be reproduced by a data reproducing apparatus according to the present invention.

In FIG. 1, N tracks $T_1, T_2, T_3, \ldots, T_{N/2-1}, T_N, \ldots, T_{N-1}, T_N$ marked by oblique lines, are tracks which are formed simultaneously when a magnetic tape having a tape width W is caused to travel is one direction. The other N tracks $T_{N+1}, T_{N+2}, \ldots, T_{2N-1}, T_{2N}$ are tracks which are formed simultaneously when the magnetic tape is caused to travel in the same direction as the above one direction, in a state where the upper and lower sides of the magnetic tape is reversed. The tape width W is equal to 3.81 mm in the case of a cassette tape, for example.

Figure 2:
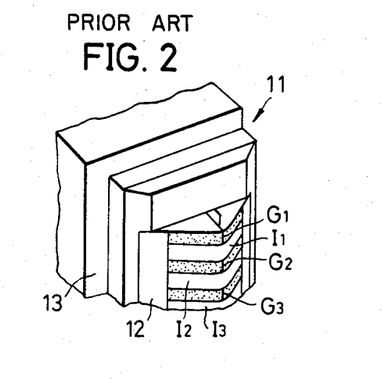
FIG. 2 is a perspective view, with a part cut away, showing an example of an essential part of a multi-track reproducing magnetic head.

The above N tracks $T_1$ through $T_N$ or $T_{N+1}$ through $T_{2N}$ are recorded and reproduced by a magnetic head 11 shown in FIG. 2. In FIG. 2, magnetic cores made of single crystal ferrite, for example, respectively having a head gap from among head gaps $G_1, G_2, G_3, \ldots, G_N$, and $N-1$ insulating members $I_1, I_2, I_3, \ldots, I_{N-1}$ inserted between adjacent magnetic cores, are provided on a glass base 12. The above magnetic cores, insulating members, and glass base are accommodated within a case 13. The N head gaps $G_1$ through $G_N$ of the head 11 are aligned in a direction perpendicular with respect to the longitudinal direction of the tape, that is, in a so-called in-line state.

Figure 3:
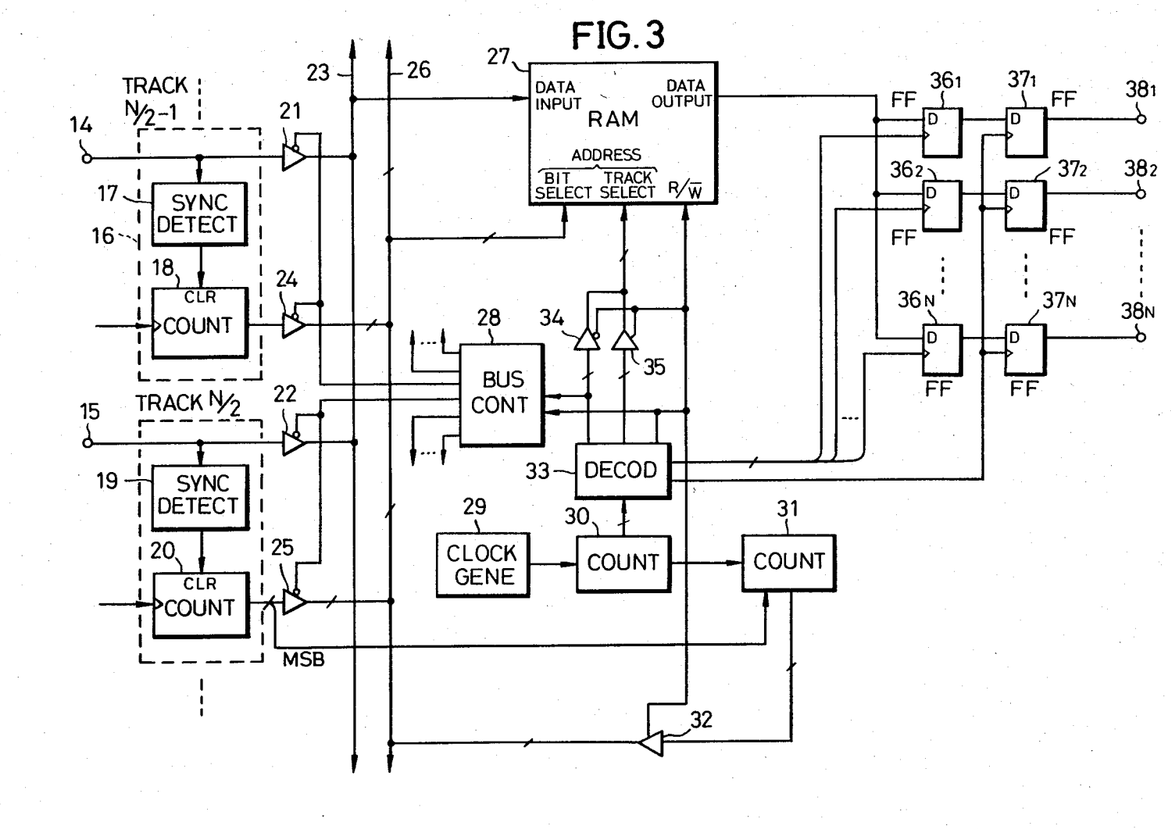
FIG. 3 is system block diagram showing a first embodiment of a data reproducing apparatus according to the present invention.
Figure 4:
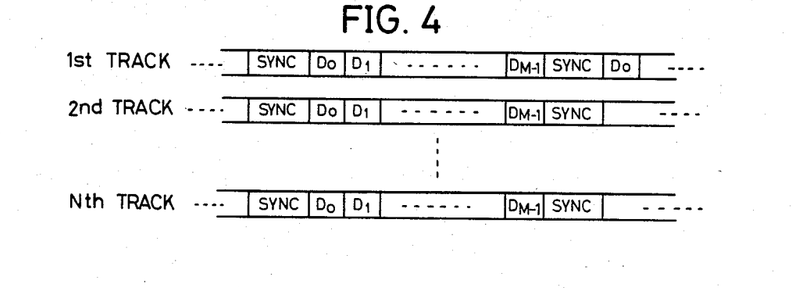
FIG. 4 is a diagram showing signal formats of signals reproduced from each track.

The N tracks $T_1$ through $T_N$ (or $T_{N+1}$ through $T_{2N}$) on the tape shown in FIG. 1 are simultaneously reproduced by the head 11 shown in FIG. 2. The reproduced signal from the track $T_{N/2-1}$ (or $T_{3N/2-1}$) is passed through a data read-out circuit (not shown) and supplied to an input terminal 14 shown in FIG. 3, where N is an even number greater than or equal to 2. In addition, the reproduced signal from the track $T_{N/2}$ (or $T_{3N/2}$) is passed through a data read-out circuit (not shown) and supplied to an input terminal 15 shown in FIG. 3. A digital data obtained by subjecting an analog information signal (audio signal, for example) to digital pulse modulation such as pulse code modulation (PCM), is divided for every predetermined section. One frame signal (one block signal) is formed by time-sequentially multiplexing a synchronizing signal SYNC indicating the beginning of a frame signal and M-bit (M is an integer greater than 1) data obtained from each of the bits $D_0, D_1, \ldots, D_{M-1}$ as shown in FIG. 4. Thus, the above digital data is dispersed and recorded in units of frame signals, by time-sequential multiplexing.

The frame signal reproduced from the $(N/2-1)$-th track and applied to the input terminal 14, is supplied to a synchronization detecting circuit 17 within a circuit part 16. The synchronizing signal SYNC is detected at the detecting circuit 17. A synchronization detection signal from the above detecting circuit 17 is applied to a clear terminal of a counter 18, to clear this counter 18 (the synchronization detection signal may be applied to a load terminal to preset a preset value in the counter 18). The counter 18 counts clock pulses from a data read-out circuit (not shown) having a period equal to the transmission rate of the M-bit data.

Figure 5:
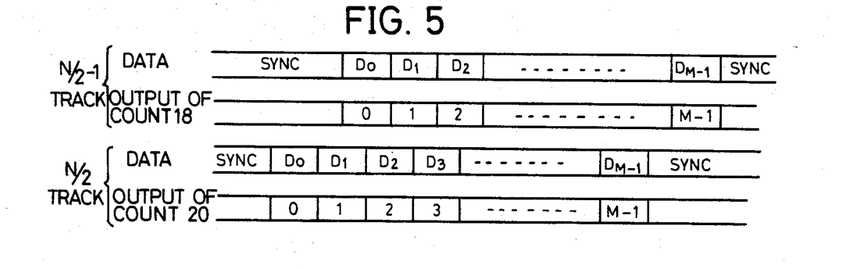
FIG. 5 is a diagram showing an example of a relationship between an input reproduced signal and a value at a write-in address counter in the block system shown in FIG. 3.

On the other hand, the frame reproduced from the N/2-th track and applied to the input terminal 15, is supplied to a synchronization detecting circuit 19 within a circuit part having the same construction as the above circuit part 16. Accordingly, the synchronizing signal is detected at the detecting circuit 19, and a counter 20 is similarly cleared by a synchronization detection signal from the detecting circuit 19. The counter 20 counts clock pulses from a data read-out circuit (not shown) provided only in a reproduced signal transmission system for the N/2-th track. As shown in FIG. 5, there is a time deviation between the data reproduced from the $(N/2-1)$-th track and the data reproduced from the N/2-th track by the head, due to skew. As a result, because the counted values in the counters 18 and 20 respectively indicate a counted value corresponding to the order of each bit in the reproduced data $D_0$ through $D_{M-1}$, time deviation is introduced between the respective counted values. However, the counted values in the counters 18 and 20 themselves are independent of the skew, and these counted values respectively and accurately correspond to the order of each bit in the reproduced data $D_0$ through $D_{M-1}$.

Each of the reproduced data from the first through $(N/2-2)$-th tracks and the $(N/2+1)$-th through N-th tracks are respectively supplied to circuit parts (not shown) similar to the above described circuit part 16.

The read-out data applied to the input terminals 14 and 15 are respectively supplied to a data bus 23, through tri-state buffers 21 and 22. The data reproduced and read out from other tracks are similarly supplied to the data bus 23 through respective tri-state buffers (not shown). Each of the outputs of the counters 18 and 20 and counters (not shown) corresponding to these counters 18 and 20, are passed through tri-state buffers 24 and 25 and tri-state buffers (not shown) corresponding to these tri-state buffers 24 and 25, and supplied to an address bus 26. Each of the read-out data of the tracks thus supplied to the data bus 23, are applied to a data input terminal of a random access memory (RAM) 27. On the other hand, the counted values indicating bit positions of the data in each track, which is supplied to the address bus 26, are applied to a bit selection terminal of the RAM 27.

The write-in of data to the RAM 27 is performed by a bus control circuit 28. During this write-in operation, the data are written in for each track with corresponding addresses, because the bus control circuit 28 time-divisionally enables the data bus 23 and the address bus 26 with respect to each track from among the first through N-th tracks. On the other hand, the read-out addresses of the RAM 27 are accessed together irrespective of the tracks. Accordingly, data compensated of the effects due to the skew are obtained at the output of the RAM 27. Description will be given in more detail hereinbelow.

Figure 7:
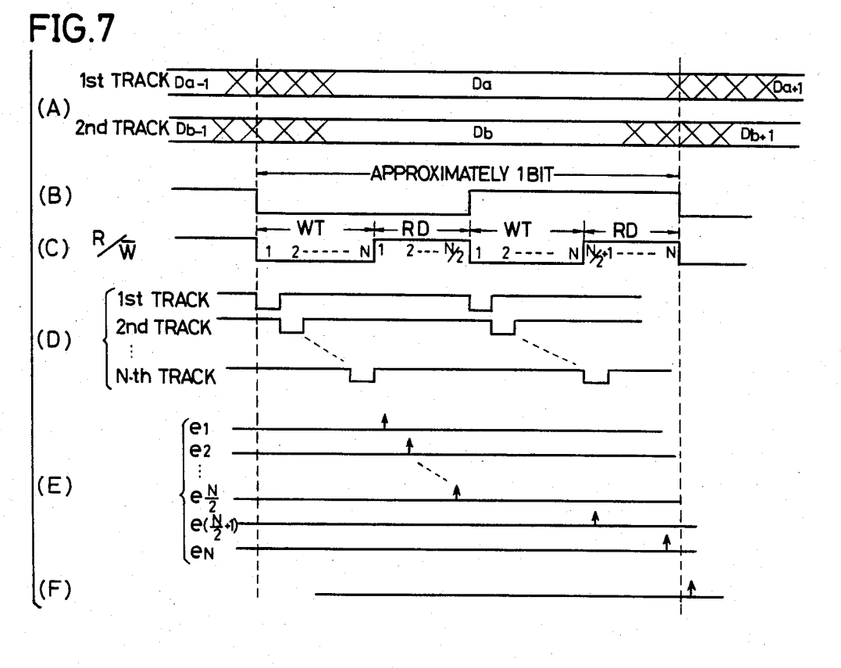
FIGS. 7(A) through 7(F) are graphs respectively showing signal waveforms of input data and signals at each part of the block system shown in FIG. 3 for explaining the operation of this block system.

FIGS. 7(A) through 7(F) respectively show timings of the write-in to and read-out from the RAM 27 and the timing of the bus control, for an average transmission rate with respect to one track. FIG. 7(A) shows the data (or the address output) of the first and second tracks, wherein $D_a$ and $D_b$ are data within the same one bit transmission period. The position and width of these data $D_a$ and $D_b$ vary according to change such as jitter in the tape travel system. The data of the first and second tracks shown in FIG. 7(A) as well as the data of the other tracks omitted in FIG. 7(A), are respectively supplied to the data input terminal of the RAM 27 shown in FIG. 3. The write-in to and read-out from the RAM 27 are alternately performed by a control signal $R/\overline{W}$ shown in FIG. 7(C) which is obtained from a decoder 33 shown in FIG. 3.

As shown in FIG. 7(C), there are two write-in periods WT and two read-out periods RD within one bit transmission period. The data of the first through N-th tracks are successively written in during one write-in period. On the other hand, the data of half of the tracks from among the first through N-th tracks are read out during one read-out period, and the written-in data from all of the tracks are read out by two read-out periods. Hence, even if the time position and the time width of the input data change, a write-in time is reserved for writing in the data of each track at least once. Moreover, even when the same data of the same track is written in twice, no problems will be introduced because the write-in is performed according to the address output from each track.

An address terminal of the RAM 27 comprises the bit selection terminal for indicating an address corresponding to the bit position of the data, and a track selection terminal for indicating an address corresponding to the track number of the data. During a transmission period of one bit of data, a constant address value is applied to the bit selection terminal, and the address at the bit selection terminal does not change. In addition, an address signal obtained from the decoder 33 supplied to the track selection terminal through a tri-stage buffer 34 or 35. An output signal of a counter 30 which counts the clock pulses from a clock generator 29, is supplied to the decoder 33.

Figure 6:
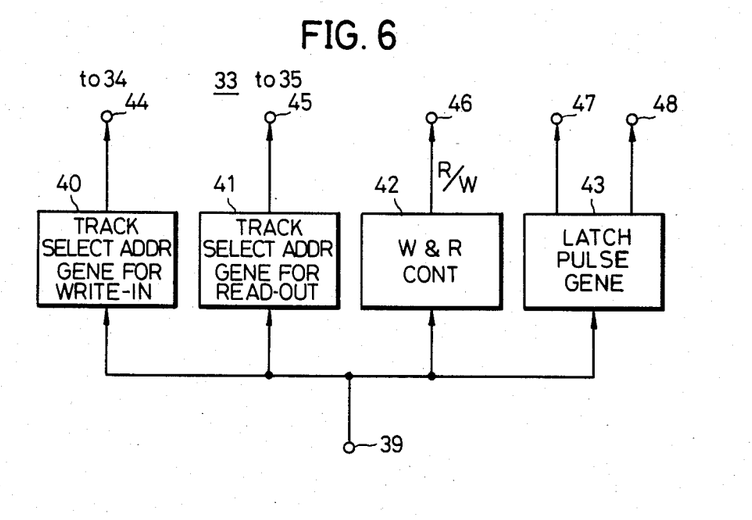
FIG. 6 is a system block diagram showing an embodiment of a decoder in the block system shown in FIG. 3.

The decoder 33 has a construction shown in FIG. 6. A counted output signal of the counter 30 which counts clock pulses having a predetermined period (a period equal to ½N the average time of the transmission rate of the input data, for example), is applied to an input terminal 39. The signal thus applied to the input terminal 39 is supplied to a track selection address generator for write-in 40, a track selection address generator for read-out 41, a write-in and read-out control circuit 42, and a latch pulse generator 43. Address signals generated by the generators 40 and 41 are respectively applied to the tri-state buffers 34 and 35. The control circuit 42 generates the control signal $R/\overline{W}$ shown in FIG. 7(C), and supplies this control signal $R/\overline{W}$ to a $R/\overline{W}$ terminal of the RAM 27, the bus control circuit 28, and the tri-state buffers 32, 34, and 35 as a control signal. Furthermore, a latch pulse shown in FIG. 7(E) which will be described hereinafter, is generated by the latch pulse generator 43, and is serially and successively supplied to delay-type (D-type) flip-flops $36_1$ through $36_N$ from an output terminal 47. Thereafter, the latch pulse generator 43 generates a latch pulse shown in FIG. 7(F), and commonly supplies the latch pulse to D-type flip-flops $37_1$ through $37_N$ from an output terminal 48.

First, description will be given with respect to the write-in operation with respect to the RAM 27. When the control signal $R/\overline{W}$ shown in FIG. 7(C) which is obtained from the control circuit 42 falls, the RAM 27 is controlled so as to perform a write-in operation as indicated by WT in FIG. 7(C) during a low-level period from the point of fall to a point when the control signal $R/\overline{W}$ next rises. In addition, a negative polarity pulse is time-divisionally generated N times from the bus control circuit 28 as shown in FIG. 7(D). The first negative polarity pulse among the negative polarity pulses shown in FIG. 7(D) is applied to a control terminal of a tri-state buffer in the transmission system for the reproduced signal of the first track, to put the tri-state buffer in an active state. Similarly, the tri-state buffers in the transmission systems for the secnd through N-th tracks are successively and time-divisionally made active (in the case of the transmission system for the reproduced signal of the (N/2−1)-th track, the tri-state buffer 21 is made active, and in the case of the transmission system for the reproduced signal of the N/2-th track, the tri-state buffer 22 is made active). Accordingly, during one write-in period WT shown in FIG. 7(C), the digital data reproduced from N tracks are time-divisionally applied to the data input terminal of the RAM 27 and written therein, through the data bus 23.

Further, the above control signal $R/\overline{W}$ only puts the tri-state buffer 34 into an active state among the tri-state buffers 32, 34, and 35, during the low-level period of the control signal $R/\overline{W}$. Hence, the address signal obtained from the track address selection generator 40 passes through an output terminal 44 shown in FIG. 6 and the tri-state buffer 34 shown in FIG. 3, and is applied to the track selection terminal of the RAM 27. On the other hand, the tri-state buffers 24, 25, and the like provided at the output stages of the counters 18 and 20, are successively and time-divisionally put into active states by a negative polarity pulse shown in FIG. 7(D), in correspondence with the reproduced data from each track applied to the RAM 27. Accordingly, during one write-in period WT indicated in FIG. 7(C), outputs of counters provided in transmission systems for reproduced signals from each track such as the counters 18 and 20, are applied to the bit selection terminal of the RAM 27. That is, during one write-in period WT, the reproduced data from each track are written into addresses specified by the counters 18, 20, and the like, independent of the skew.

Here, if the write-in with respect to the RAM 27 is performed at a time when the input data to the input terminals 14, 15, and the like or the outputs of the counters 18, 20, and the like change, the contents in the RAM 27 will become indefinite. Thus, this has to be considered upon actual realization of the circuit. That is, the same master clock may be used for each circuit so that the data read-out circuit, counter 18, and the like operate in synchronism with the counters 30 and 31. As another alternative, a latch circuit which is operated by the clock of the counters 30 and 31 may be inserted at a stage immediately preceding point where the signals are supplied to the data bus 23 and the address bus 26. In this case, the output of the latch circuit may be supplied to the data bus 23 and the address bus 26, for example.

Next, description will be given with respect to the operation upon read-out from the above RAM 27. When the control signal R/$\overline{W}$ shown in FIG. 7(C) obtained from the control circuit 42 rises, the RAM 27 is controlled so as to perform a read-out operation during a period RD indicated in FIG. 7(C). This read-out period RD corresponds to a high-level period of the control signal R/$\overline{W}$ from the above rise to a point when the control signal R/$\overline{W}$ next falls. Moreover, during this read-out period RD, the tri-state buffers 32 and 35 among the tri-state buffers 32, 24, and 35 are respectively controlled in their active states. In addition, due to the operation of the tri-state buffers 21, 22, 24, 25, and the like which are supplied with the high-level output signal of the bus control circuit 28, the signals from the transmission systems for reproduced signals of each track are all put into transmission interrupting states.

On the other hand, the clock pulses from the clock generaor 29 are frequency-divided at the counter 30, and is converted into a pulse shown in FIG. 7(B) having a period equal to the average time of the transmission rate of the input data. This converted pulse thus obtained, is obtained from a carry-out terminal CA of the counter 30 and applied to the counter 31. The counter 31 is an address counter for indicating the position of the data within a frame upon data read-out. If the data within the frame signal is an M-bit data, the above counter 31 frequency-divides the frequency of the input pulse to 1/M the original frequency, and the frequency-divided output is applied to the bit selection terminal of the RAM 27 through the tri-state buffer 32 and the address bus 27. That is, the above counter 31 is an address counter upon read-out and is in correspondence with the counter 18 and the like, but differs from the address counter upon write-in in that only one is provided in common for all of the tracks. The output address value of the counter 31 assumes a constant value during a transmisson period for approximately one bit, and is incremented by "1" as one bit transmission period elapses.

In addition, the address signal generated from the track selection address generator 41 shown in FIG. 6 is applied to the track selection terminal of the RAM 27, through an output terminal 45 and the tri-state buffer 35 shown in FIG. 3. Here, the value of the output address signal of the generator 41 successively changes from 1 to N/2 during one read-out period RD as shown in FIG. 7(C). During the second read-out period RD, the value of the above output address signal of the generator 41 successively changes from (N/2+1) to N.

Therefore, during the first read-out period RD indicated in FIG. 7(C), each of the reproduced data from the first through N/2-th tracks and having the same bit position are time-divisionally read out. Similarly, during the second read-out period RD, each of the reproduced data from the remaining (N/2+1)-th through N-th tracks and having the same bit position are time-divisionally read out. Becauuse only a single address counter for read-out bit selection is provided, which is the counter 31, the RAM 27 can be accessed independent of the tracks. As a result, data compensated of the effects due to the skew, are read out from the RAM 27.

The data read out from the RAM 27 are respectively applied to data terminals of the N D-type flip-flops $36_1$ through $36_N$. Latch pulses are generated from the latch pulse generator 43 within the decoder 33, with timings indicated by $e_1$ through $e_N$ in FIG. 7(E). These latch pulses are supplied to clock input terminals of the flip-flops $36_1$ through $36_N$ through the output terminal 47, to latch the read-out data applied thereto. That is, the latch pulse generated with the timing indicated by $e_1$ in FIG. 7(E) is supplied to the clock input terminal of the flip-flop $36_1$, to perform the latching. Similarly, the latching is performed at the flip-flops $36_2$ through $36_N$ by the latch pulses generated with the timings indicated by $e_2$ through $e_N$ in FIG. 7(E) and supplied to the respective clock input terminals.

The output signals of the flip-flops $36_1$ through $36_N$ are applied independently to respective data input terminals of the D-type flip-flops $37_1$ through $37_N$. A latch pulse is generated from the latch pulse generator 43 shown in FIG. 6 within the decoder 33, with a timing indicated by an arrow in FIG. 7(F). This single latch pulse is simultaneously and commonly supplied to each clock input terminal of the flip-flops $37_1$ through $37_N$, through the output terminal 48, to simultaneously perform latching at the flip-flops $37_1$ through $37_N$. Hence, the flip-flops $37_1$ through $37_N$ respectively arrange the timings of the reproduced data from all of the tracks, and produces these data in parallel through output terminals $38_1$ through $38_N$, to supply these data to a code error correcting circuit (not shown) provided at a succeeding stage. For example, a RAM HM6147LP can be used as the above RAM 27.

Next, description will be given with respect to the outputs from the most significant bit (MSB) of the write-in address counter and the MSB of the read-out address counter 31, by referring to FIG. 8. Each reproduced data from the first track formed in the vicinity of the edge of the magnetic tape and the N/2-th track formed substantially at the central part of the magnetic tape which are obtained from the data read-out circuit, respectively have time deviation due to the skew as shown in FIGS. 8(A) and 8(C). However, the output from the MSB of the write-in address counter for the first track shown in FIG. 8(B) is in phase synchronism with the reproduced data of the first track shown in FIG. 8(A). Similarly, the output from the MSB of the write-in address counter 20 for the N/2-th track shown in FIG. 8(D) is in phase synchronism with the reproduced data of the N/2-th track shown in FIG. 8(D). Accordingly, there is a timing deviation in the outputs from the MSBs of the two write-in address counters, in correspondence with the skew.

Figure 8:
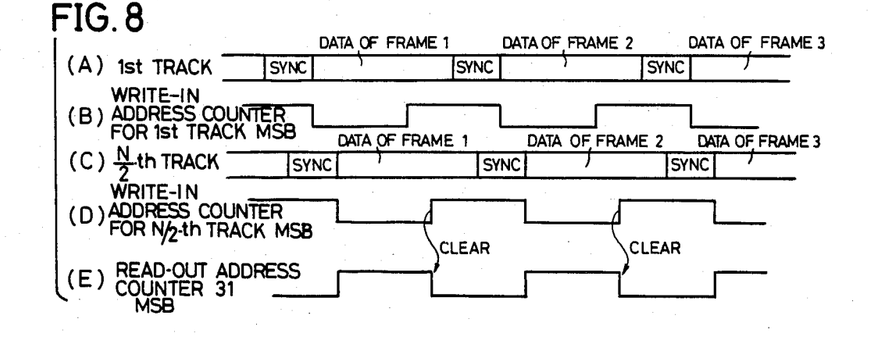
FIGS. 8(A) through 8(E) are graphs respectively showing signal waveforms of input data and signals at each part of the block system shown in FIG. 3 for explaining the operation of this block system.

On the other hand, as shown in FIGS. 3 and 8, the counter 31 is cleared by the rise in the MSB of the write-in address counter 20 for the N/2-th track $T_{N/2}$ (or $T_{3N/2}$) which is formed substantially at the central part of the magnetic tape among the multi-tracks. Hence, the phase of the output from the MSB of the counter 31 lags the outputs from the MSBs of the write-in address counters for the first and N/2-th tracks shown in FIGS. 8(B) and 8(D), by approximately ½ frame transmission time as shown in FIG. 8(E). As a result, the read-out from the RAM 27 is performed after approximately ½ frame transmission time has elapsed from the write-in. Thus, the data read out from the RAM 27 which is accessed independently of the tracks by the read-out address obtained from the single counter 31, are read out with the timing arranged, that is, with the effects of the skew compensated. The quantity of the effects due to the skew which is compensated, is in the range of ½ frame transmission period at maximum. The output from the MSB of the write-in address counter 20 for the N/2-th track formed at substantially the central part of the magnetic tape is used for clearing the counter 31 which is the read-out address counter, in the embodiment described above. This is because the track position of the N/2-th track is at the central part of the multi-tracks, and higher stability upon tape travel and smaller code error rate are obtained as compared to the tracks in the vicinity of the edges of the magnetic tape. Thus there is less distortion in the write-in address counter because stable control can be carried out with respect to the read-out address counter.

Figure 9:
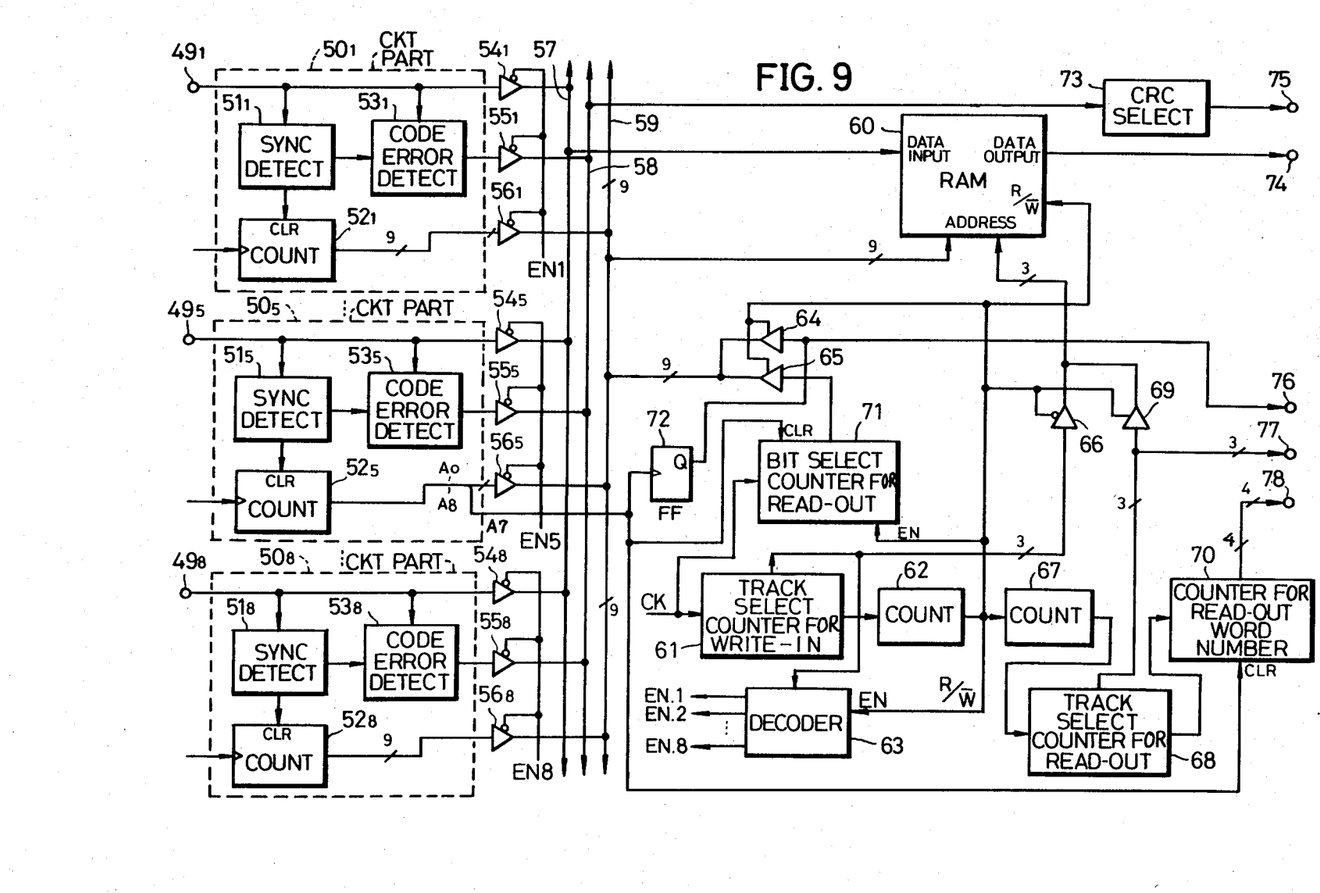
FIG. 9 is a system block diagram showing a second embodiment of a data reproducing apparatus according to the present invention.
Figure 10:
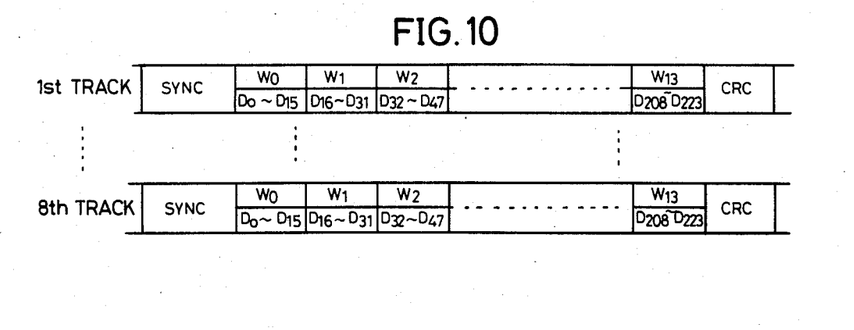
FIG. 10 shows signal formats of reproduced signals supplied to the block system shown in FIG. 9.

Next, description will be given with respect to a second concrete embodiment of an apparatus according to the present invention. In FIG. 9, reproduced frame signals having the constitution shown in FIG. 10 which are independently reproduced from eight tracks and read out from a data read-out circuit (not shown), are simultaneously applied to input terminals $49_1$ through $49_8$. In FIG. 10, fourteen words $W_0$ through $W_{13}$ respectively constituted by sixteen bits are time-sequentially composed succeeding a synchronizing signal SYNC, and a 16-bit code error detection code CRC is further added succeeding the above word $W_{13}$. In addition, $D_0$ through $D_{223}$ respectively indicate the first through 224th data in terms of one bit. That is, a frame signal constituting one frame from the signal SYNC to the code CRC, is time-sequentially composed in terms of frames and recorded on each track. The code error detection code is added within the reproduced frame signal from each track, besides the data. This code error detection code is used to detect the code error, and the code error detection result is used to correct the errors in terms of words $W_0$ through $W_{13}$ at a code error detecting circuit provided at a succeeding stage of the circuit shown in FIG. 9. Accordingly, as will be described hereinafter, the above code error detection result is added to the data in terms of each word and obtained at the output of the circuit shown in FIG. 9. Furthermore, a memory is used in the above described code error correcting circuit, in order to perform the code error correction and compensate for the jitter introduced due to wow and flutter and the like in the tape travel system. An efficient signal producing format is employed wherein an address indicating the word number and the track number are produced at the output of the circuit shown in FIG. 9 together with the above data and the code error detection result, as the address of the above memory in the code error detecting circuit.

In FIG. 9, the reproduced frame signal from the first track which is applied to the input terminal $49_1$, is supplied to a synchronization detecting circuit $51_1$ within a circuit part $50_1$. The synchronizing signal indicated by SYNC in FIG. 10 is detected at the synchronization detecting circuit $51_1$, and a counter $52_1$ and a code error detecting circuit $53_1$ are respectively cleared by the detection pulse produced from the synchronization detecting circuit $51_1$. As shown in FIG. 9, a total of 224 bits of data $D_0$ through $D_{223}$ exist within one frame.

Thus, eight bits necessary for the address in order to indicate the data position within the same frame signal. In the case of the signal format shown in FIG. 4, the number of address buses 26 shown in FIG. 3 is eight. On the other hand, in the case of the present embodiment of the invention wherein a frame signal added with the code error detection signal as shown in FIG. 10 is supplied, a counter having a period of two frames is additionally provided, and the number of address buses 59 becomes nine. The counter $52_1$ is a write-in address counter for the first track, and counts clock pulses from a data read-out circuit (not shown) having a period equal to the transmission bit rate. In addition, the code error detecting circuit $53_1$ is a circuit for detecting the code error of the input frame signal, according to whether a remainder exists after dividing the total of 240 bits of the data and the code error detection code within the input frame signal by a predetermined producing polynomial. That is, because the remainder obtained when dividing the 224 bits of data by the above producing polynomial is recorded as the 16-bit core error detection code CRC, the remainder obtained when the above 240 bits of data by the above producing polynomial becomes zero if there is no code error. Each of the reproduced frame signals from the second through eighth tracks are supplied to the input terminals $49_2$ through $49_8$. Circuit parts $50_2$ through $50_8$ respectively connected to these input terminals $49_2$ through $49_8$ have the same circuit construction as the above described circuit part $50_1$.

Figure 11:
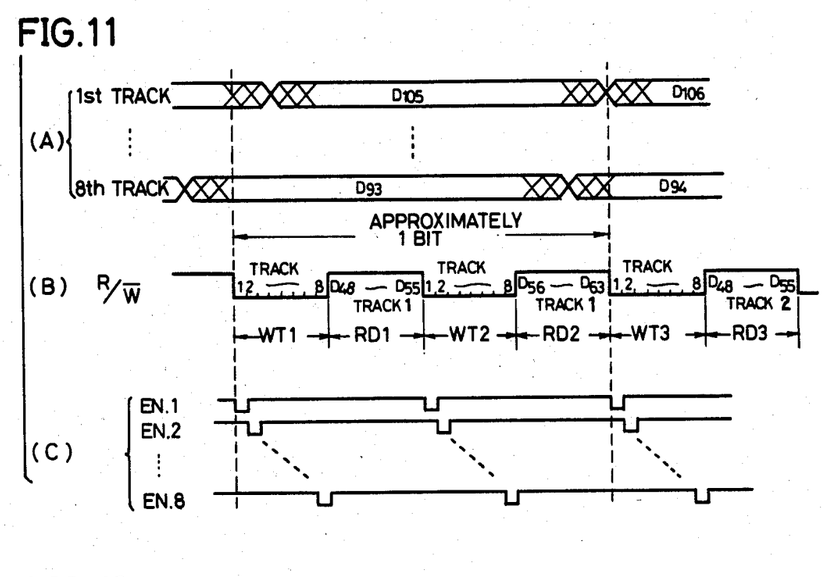
FIGS. 11(A) through 11(C) are graphs respectively showing signal waveforms of input data and signals at each part of the block system shown in FIG. 9 for explaining the operation of this block system.

Next, description will be given with respect to the write-in and read-out timings of a RAM 60 which is a buffer memory. For example, as shown in FIG. 11(A), it is assumed that the data $D_{105}$ and address at the 106th bit position after the synchronizing signal reproduced from the first track, and the data $D_{93}$ and address at the 94th bit position after the synchronizing signal reproduced from the eighth track, are respectively supplied to the buses 57 and 59. In this state, the write-in and read-out are respectively performed twice, alternately, in the RAM 60 within the transmission period of one bit as shown in FIG. 11(B), according to an output control signal of a counter 62. Moreover, during each write-in period of write-in periods WT1 and WT2 indicated in FIG. 11(B), the write-in of one bit of data of all the tracks from the first through eighth tracks is successively performed. Hence, a write-in time is reserved for writing in the the data of each track at least once. In addition, of read-out periods RD1 and RD2 indicated in FIG. 11(B), the data $D_{48}$ through $D_{55}$ which are the first half of data within the fourth word $W_3$ of the reproduced frame signal from the first track, for example, are read out during the read-out period RD1. Thereafter, the data $D_{48}$ through $D_{55}$ which are the latter half of data within the above fourth word $W_3$, are read out during the second read-out period RD2. During a read-out period RD3 within the succeeding transmission period of one bit, the data $D_{48}$ through $D_{55}$ which are the first half of data within the fourth word $W_3$ of the reproduced frame signal from the second track are read out as shown in FIG. 11(B). Accordingly, the read-out of data is performed in terms of words in such an order wherein the word $W_0$ within the frame signal from the first track, the word $W_0$ within the frame signal from the second track, . . . , the word $W_0$ within the frame signal from the eighth track, the word $W_1$ within the frame signal from the first track, the word $W_1$ within the frame signal from the second track, . . . , and the word $W_{13}$ within the frame signal from the eighth track, are read out for every transmission period of one bit.

In FIG. 9, a track selection counter 61 for write-in makes access to the RAM 60 upon write-in through a tri-state buffer 66, at an address which indicates the track. A decoder 63 decodes an output of the track selection counter 61, and successively and time-sequentially supplies control signals EN.1 through EN.8 shown in FIG. 11(C) to tri-state buffers $54_1$ through $54_8$, $55_1$ through $55_8$, and $56_1$ through $56_8$ during the write-in periods WT1 and WT2 indicated in FIG. 11(B), to put these tri-state buffers into active states during the low-level period of the control signals EN.1 through EN.8.

Accordingly, during the write-in period WT1 or WT2 of the RAM 60, the control signal EN.1 is first generated, and the tri-state buffers $54_1$, $55_1$, and $56_1$ are put into their active states. The data within the reproduced frame signal from the first track which is applied to the input terminal $49_1$ is applied to a data input terminal of the RAM 60, through the tri-state buffer $54_1$ and the data bus 57. In addition, the code error detection result of the reproduced frame signal from the first track, which is obtained from the core error detecting circuit $53_1$, is supplied to a CRC selection circuit 73, through the tri-state buffer $55_1$ and an error flag bus 58. Furthermore, a counted value corresponding to the input data of the reproduced signal from the first track, is applied to an address input terminal (bit selection terminal) of the RAM 60 as a write-in address signal, through the tri-state buffer $56_1$ and the address bus 59.

The data within the reproduced frame signals from the second through eighth tracks, the code error detection results, and the write-in address signals are time-divisionally supplied to the RAM 60, CRC selection circuit 73, and the like, similarly as in the above described case for the data and the like of the first track, because the tri-state buffers $54_2$ through $54_8$, $55_2$ through $55_8$, and $56_2$ through $56_8$ are respectively put into their active states time-divisionally by the control signals EN.2 through EN.8.

The counter 62 forms the timings of the above write-in and read-out, and generates the control signal shown in FIG. 11(C). This control signal thus generated by the counter 62 controls tri-state buffers 64, 65, 66, and 69, decoder 63, and the write-in and read-out with respect to the RAM 60. On the other hand, this control signal is also supplied to a counter 67 wherein the control signal is frequency-divided. The frequency-divided output of the counter 67 is applied to a track selection counter 68 for read-out, and counted therein. The counter 67 is provided in order to reserve two write-in periods within the transmission period of one bit. During the write-in periods WT1, WT2, and the like which are low-level periods of the above described control signal, only the tri-state buffer 66 from among the tri-state buffers 64, 65, 66, and 69 is put into the active state. For this reason, the output address signal of the track selection counter 61 is applied to the address terminal (track selection terminal) of the RAM 60, through the tri-state buffer 66. In correspondence with the reproduced data of eight tracks which are time-divisionally supplied to the RAM 60 during one write-in period, the track selection counter 61 specifies the respective addresses. Hence, the reproduced data from each of the tracks are successively written into the RAM 60 at predetermined addresses allocated in advance for these reproduced data, independent of the skew.

Next, when the control signal shown in FIG. 11(C) assumes high level, the RAM 60 is controlled of the read-out during the high-level period of the control signal as indicated by read-out periods RD1, RD2, RD3, and the like. On the other hand, the tri-state buffers 64, 65, and 69 from among the tri-state buffers 64, 65, 66, and 69 are put into their active states. In addition, as shown in FIG. 11(C), the output signal of the decoder 63 assumes high level. As a result, the tri-state buffers $54_1$ through $54_8$, $55_1$ through $55_8$, and $56_1$ through $56_8$ are all switched over to input interrupting states. Therefore, no input is obtained at the data input terminal of the RAM 60, and at the same time, the counted value at the counter 68 is applied to the address terminal (track selection terminal) of the RAM 60 as an address signal for selecting the track upon read-out, through the tri-state buffer 69. Moreover, a counted value in a bit selection counter 71 for read-out is applied to the address terminal (bit selection terminal) of the RAM 60 as an address for selecting the data number upon read-out, through the tri-state buffer 65 and the address bus 59.

The counter 71 counts clock pulses having a frequency in the range of 4 MHz which is obtained from a clock generator (not shown), during the read-out period. The counted value in the counter 71 indicates the order (from zero to 223) of the bit position of the read-out data within the read-out periods RD1, RD2, RD3, and the like indicated in FIG. 11(B), and indicates the order of eight bits which is one-half the sixteen bits constituting one word within one read-out period. On the other hand, during the transmission period of approximately one bit of the reproduced frame signal, the address value for track selection in the counter 68 is constant, and is incremented by one for each transmission period of one bit. Accordingly, during one read-out period such as the read-out periods RD1, RD2, and RD3, the data of the first half or the second half of one word of the same track are read out from the RAM 60 through an output terminal 74. These data thus read out become data of the bit position according to the value in the counter 71.

Further, during the above read-out, a code error detection result is produced from the CRC selection circuit 73 with a timing which will be described hereinafter, and supplied to an output terminal 75. In addition, the output signal of the counter 68 is supplied to a counter 70 for read-out word number, and counted thereat. A 4-bit counted output signal of the counter 70 indicates the word number of the fourteen words $W_0$ through $W_{13}$ constituting the above frame signal. The 4-bit counted output signal of the counter 70 is supplied to an output terminal 78 as an address indicating the word, and is supplied to a code error correcting circuit (not shown) provided in a succeeding stage, together with an address indicating the read-out track which is supplied to an output terminal 77 from the counter 68, and used as a write-in address of a memory for correction.

Figure 12:
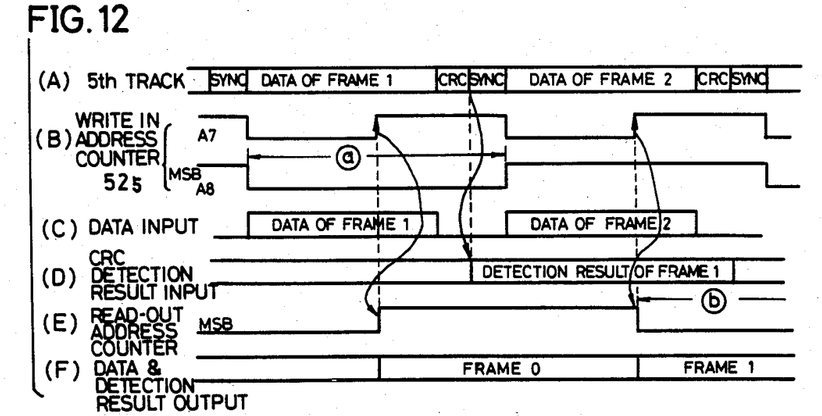
FIGS. 12(A) through 12(F) are graphs respectively showing signal waveforms of input data and signals at each part of the block system shown in FIG. 9 for explaining the operation of this block system.

Next, description will be given with respect to the relationship between the data and the code error detection result. The code error detection result is obtained after the last bit of the code error detection code (CRC) is applied. Hence, the timing is shifted by a period corresponding to approximately one frame transmission period. For example, if the reproduced frame signal of the fifth track is supplied to the input terminal $49_5$ shown in FIG. 9 time-sequentially with an order shown in FIG. 12(A), the code error detection result is supplied to the error flag bus 58 with a time lag corresponding to approximately one frame transmission period as shown in FIG. 12(D). Thus, in the present embodiment of the invention, outputs having periods which are equal to two frame transmission periods are assumed to be the outputs of the MSBs of the write-in counter and the read-out counter. This means that the read-out counter is operated lagging the write-in address counter in phase, by approximately 1.5 frame transmission periods.

That is, explaining this in conjunction with FIG. 9, a flip-flop 72 performs a toggle operation by a rise in an output of a second bit $A_7$ shown in FIG. 12(B) which is obtained from the write-in address counter $52_1$ within the circuit part $50_5$, having a period equal to one frame transmission period. An output signal of this flip-flop 72 shown in FIG. 12(E) assumes the output of the MSB of the read-out address counter, and is supplied to the address bus 59 through the tri-state buffer 64. The output signal of the flip-flop 72 is also supplied to an output terminal 76. Hence, the data of frame 1 shown in FIGS. 12(A) and 12(C) which is written in within a period (a) indicated in FIG. 12(B), is read out as an output during a low-level period (b) shown in FIG. 12(E) of the output signal of the MSB of the above read-out address counter. In FIG. 12(B), $A_8$ indicates the output signal waveform of the MSB of the write-in address counter $52_5$ within the circuit part $50_5$. In addition, the counters 70 and 71 are respectively cleared by an output signal $A_7$ of the counter $52_5$.

Prior to the read-out of the above data, the detection result of the frame 1 supplied to the error flag bus 58 with a timing immediately after the error code detection code CRC as shown in FIG. 12(D) is supplied to the CRC selection circuit 73. The detection results in accordance with each of the tracks, are supplied to the output terminal 75 from the CRC selection circuit 73 for every data word. Accordingly, the data read out at the output terminal 74 from the data output terminal of the RAM 60 and the detection result supplied to the output terminal 75, are produced with a timing shown in FIG. 12(F). In the present embodiment of the invention, unlike in the above first embodiment of the invention, the data read out at the output terminal 74 are produced serially. However, because the data read out and produced serially is produced with a predetermined timing, it can be said that the data of each track are arranged of the timing as in the case of the first embodiment of the invention.

According to the present embodiment of the invention, the read-out address counter operates lagging the write-in address counter by approximately 1.5 frame transmission periods. Accordingly, the quantity of the effects caused by the skew which is compensated, becomes equal to ½ frame as in the above first embodiment of the invention.

Further, the present invention is not limited to these embodiments, but various variations and modifications may be made without departing from the scope of the present invention.

What is claimed is:

1. A data reproducing apparatus for reproducing data recorded on multi-tracks, which reproduces data within reproduced frame signals by simultaneously reproducing a plurality of tracks on a recording medium, said frame signal being constituted by said data obtained by subjecting an analog information signal to digital pulse modulation and at least a synchronizing signal, signals obtained by time-sequentially composing said frame signals in terms of frame signals being dispersed and recorded on said plurality of tracks on said recording medium, said data reproducing apparatus comprising:
a signal transducer for simultaneously reproducing said frame signals recorded on said recording medium from said plurality of tracks;
a write-in address generating circuit provided in each of transmission systems for reproduced signals from each track of said plurality of tracks obtained in parallel from said signal transducer, for generating a write-in address indicating the number of bits of data within one frame signal from a counter which counts clock pulses having a period equal to the transmission bit rate, said write-in address generating circuit being preset or cleared by a detection pulse obtained by detecting said synchronizing signal within the reproduced frame signals;
a memory into which data within frame signals reproduced from each track among said plurality of tracks are written, and from which said written-in data are read out; and
memory control means for controlling said memory so as to successively and recursively apply the data within the frame signals reproduced from each track among said plurality of tracks and write in the data at the write-in addresses obtained from said write-in address generating circuit, and read out the written-in data of each of the tracks from said memory with the timing arranged after a predetermined time has elapsed.

2. A data reproducing apparatus as claimed in claim 1 in which said memory control means is a means for operating to cause said memory to alternately perform a write-in operation and a read-out operation for a total of two times, respectively, within a period substantially equal to the transmission period of one bit of said reproduced frame signals, to successively and recursively write in the data of frame signals reproduced from each track among said plurality of tracks for each track during one write-in period, and to read out the bits of the same bit position of data within one frame signal for all the tracks or read out one word of data within one frame signal reproduced from the same track by two of said read-out periods.

3. A data reproducing apparatus as claimed in claim 1 in which said memory control means comprises means for controlling the timing with which the written-in data is read out from said memory, by an output signal of said counter within said write-in address generating circuit provided in a transmission system for reproduced signals from tracks recorded and formed at substantially the central part of said plurality of tracks on said recording medium.

4. A data reproducing apparatus as claimed in claim 1 in which said write-in address generating circuit further comprises a code error detecting circuit for detecting code error by existence or non-existence of a remainder when a code error detection code and data within said reproduced frame signals are divided by a predetermined producing polynomial, said code error detecting circuit being cleared by said synchronizing signal detection pulse, said memory control means comprises means for setting the timing with which the write-in and read-out with respect to said memory to approximately a transmission period of 1.5 frame signals after said data write-in to said memory, and said data reproducing apparatus further comprises means for supplying a code error detection result of the frame signal obtained from said code error detecting circuit to an error flag bus during a transmission period from the last bit of that frame signal to the bit of a succeeding frame signal, and a selecting circuit supplied with said code error detection result of the frame signal reproduced from each track through said error flag bus, for reading the code error detection result and simultaneously producing the output code error detection result of said selecting circuit and the data read out from said memory.

5. A data reproducing apparatus as claimed in claim 2 in which said memory control means comprises another single counter for counting clock pulses having a period equal to an average time of the transmission rate of said reproduced frame signal, to generate a counted value output signal having a period substantially equal to the transmission period of one bit of said reproduced frame signal, said other counter being cleared by a signal from a most significant bit of said counter within said write-in address generating circuit provided in the transmission system for the reproduced signals from tracks recorded and formed at substantially a central part of the plurality of tracks on said recording medium, to read out said counted value output signal and supply the same to said memory as an a read-out address, and read out bits of data at the same bit position within said one frame signal for all the tracks during said two read-out periods.

6. A data reproducing apparatus as claimed in claim 2 in which said memory control means comprises a flip-flop which performs a toggle operation by a bit output having a period equal to the transmission period of one frame of said counter within said write-in address generating circuit provided in the transmission system for the reproduced signal from tracks recorded and formed at substantially a central part of the plurality of tracks on said recording medium, and applies an output of said flip-flop to said memory as a signal of the most significant bit of the read-out address signal for reading out the written-in data of each track in terms of words from said memory.

* * * * *